United States Patent [19]
Ginsberg

[11] 3,793,533
[45] Feb. 19, 1974

[54] ELECTRICAL SAFETY CONTROL CIRCUIT

[75] Inventor: Leon Ginsberg, Toronto, Ontario, Canada

[73] Assignee: Precision Electronic Components (1971) Ltd., Toronto, Ontario, Canada

[22] Filed: Mar. 16, 1973

[21] Appl. No.: 342,312

[52] U.S. Cl. ............................. 307/113, 317/135 R
[51] Int. Cl. ......................................... H01h 47/00
[58] Field of Search 307/112, 113, 116; 317/135 R, 317/135 A

[56] References Cited
UNITED STATES PATENTS
2,962,633  11/1960  Raymond ........................... 307/113
3,089,985  5/1963  Camfield et al. ................. 317/135 R Primary Examiner—Robert K. Schaefer
Assistant Examiner—M. Ginsburg

[57] ABSTRACT

A safety control circuit for punch presses and the like has two push buttons which must be pressed almost simultaneously, each push button permitting discharge of a capacitor through a different relay coil. The relay coils move switches from first to second positions to connect to a power supply an electrical device which controls the punch press or the like. To ensure that the circuit fails safe, each relay coil has at least a pair of switches, and in their first positions the switches of these pairs are all connected in series between one side of the capacitor and the power supply. The other side of the capacitor may be grounded.

7 Claims, 2 Drawing Figures

ELECTRICAL SAFETY CONTROL CIRCUIT

BACKGROUND OF THE INVENTION

1. Field of the Invention

This invention relates to a safety circuit for energizing an electrical device, for example a solenoid or contactor, for operating a machine, for example a punch press.

2. Description of the Prior Art

It is common to provide two hand-operated switches which must be closed to permit operation of a machine, but operators are able to defeat many systems now in use, and many such systems may be unsafe if a component of the system fails.

SUMMARY OF THE INVENTION

The present invention utilizes two manually closable switches which must be operated within a predetermined short time of each other if the machine is to operate, the time depending on the rate of discharge of a capacitor. The capacitor is charged through four normally series-connected switches between one side of the capacitor and a power supply. The other side of the capacitor is be grounded. Operation of the manually closable switches causes the capacitor to discharge through relay coils, one controlling one pair of the four switches and the other controlling the other pair. If the manually closable switches are operated within the predetermined short time, and all components are functioning properly, an electrical device for operating the machine is energized through a switch of each of the relays.

BRIEF DESCRIPTION OF THE DRAWINGS

Two embodiments of the invention are illustrated by way of example in the accompanying drawings in which.

DESCRIPTION OF THE PREFERRED EMBODIMENTS

Figure 1:
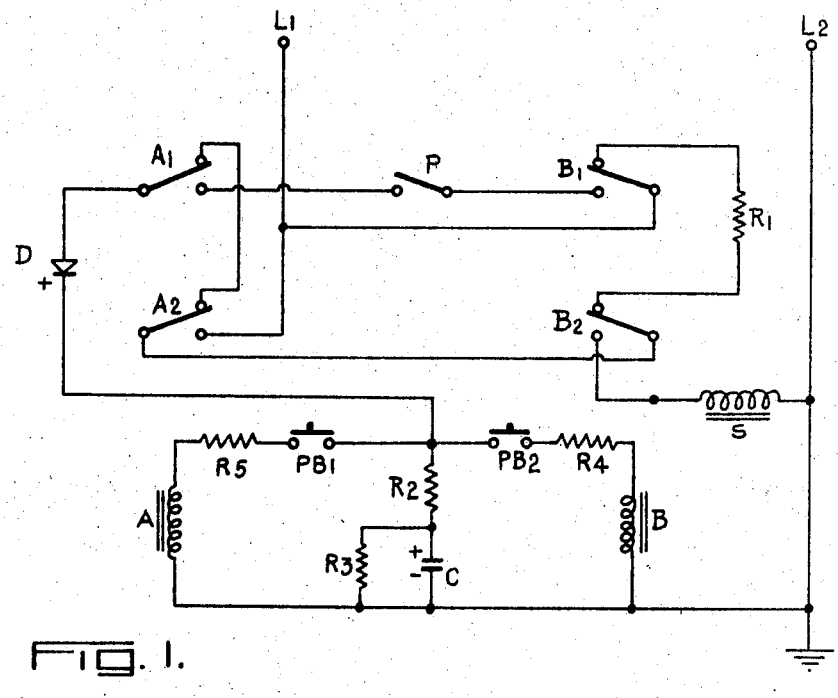
FIG. 1 shows a circuit which can be operated by pushing two buttons, within a short time of each other, to provide either a pulse of power to a solenoid or, in another mode, to provide a continuous flow of power to the solenoid while both buttons continue to be depressed.

The entire circuit of FIG. 1 can be housed within a sealed enclosure from which a pair of wires can run to an alternating current supply L1, L2 (L2 may be an electrical ground), two pairs of wires can run to push button switches PB1, PB2, and a pair of wires can run to a contactor or solenoid S (or other electrically controlled device, for example a clutch). Solenoid S when energized causes a punch press, rivetter, welder, guillotine cutter or the like to operate. The circuit includes two relays having coils A and B respectively, and the circuit is shown in the normal condition, connected to the supply L1, L2, with the coils A and B deenergized. Relay coil A can be energized to move a pair of relay switches A1, A2 from the normal or first positions, in which they are shown, to their alternate or second positions, and similarly relay coil B can be energized to move a pair of relay switches B1, B2 from their normal or first positions shown to their second positions.

In the normal condition shown, a capacitor C is charged from the supply terminal L1 through switch B1, current limiting resistor R1, switch B2, switch A2, switch A1, diode rectifier D and current limiting resistor R2, the other side of the capacitor C being connected to L2. A resistor R3 connected across capacitor C will allow the latter to discharge slowly when the power supply is switched off to service the unit.

Suppose that, with capacitor C charged, push button PB2 is closed. Capacitor C begins to discharge through relay coil B and resistor R4, the latter reducing current surge and sparking when the inductive relay coil B is switched on or off. (Resistor R5 in series with relay coil A serves a similar purpose.) Coil B when energized causes its pair of switches B1 and B2 to move to their second positions. B1 thereby disconnects the capacitor C and relay B from L1. Diode D prevents discharge of capacitor C through solenoid S, but the capacitor continues to discharge through relay coil B. If nothing further is done, C soon becomes sufficiently discharged to cease holding relay B in, switches B1 and B2 return to the position illustrated, and solenoid S remains deenergized. If PB2 is still being depressed, so that relay coil B is now, with capacitor C, connected across L1, L2, capacitor C does not become substantially recharged, and coil B is in series with resistors R1 and R4 and receives less current than it requires to pick up again, i.e., to move switches B1 and B2 from their first positions illustrated. Thus, putting a weight on PB2, or short-circuiting it, will cause relay B to pick up for only a moment while capacitor C discharges through it. A similar operation will occur if only PB1 is depressed while PB2 remains open.

If, however, with capacitor C charged, push buttons PB1 and PB2 are depressed within a very short time of each other, for example within one-tenth of a second of each other, relay coils A and B both receive from capacitor C sufficient discharge current to pick up. Switches A2 and B2, in their second positions, are in series between power supply terminal L1 and solenoid S, and the solenoid S receives power from the supply. However if switch P is open, terminal L1 is disconnected from capacitor C and coils A and B, so that the relays drop out after, for example, half a second. If PB1 or PB2 or both are still depressed, capacitor C will not recharge and relay coils A and B draw insufficient current through their series-connected resistors to pick up again. The solenoid S received only a pulse of power during the half second that the relays were picked up. Whether such a pulse is to be effective to cause solenoid S to operate an associated machine (not shown) will depend on the user's requirements, and it is a simple matter to choose a solenoid or other electrical device that will or will not respond to such a pulse. If it is desired to have a sustained flow of current through solenoid S, the circuit is modified by permanently closing the switch P. (This may be a factory adjustment, so that P may be within the sealed enclosure that houses the relay switches A1, A2, B1, B2.) Then, with capacitor C charged, if PB1 and PB2 are both closed within a short time of each other the two relays are energized by discharge of capacitor C, and switches B1 and A1 connect L1 through diode D to coils A and B, by-passing the current limiting resistor R1 and causing relays A and B to hold their switches in their second positions as long as both PB1 and PB2 remain depressed. Thus, after energization of the relay coils, the charge on the capacitor is supplemented from L1 by the series connection of switches B1 and A1 in their second positions. As long as PB1 and PB2 are depressed, solenoid S receives power from L1 through switches A2 and B2. Such an arrangement may be desired, for example, with a mechanical press which is to continue to run with repeated strokes as long as both hands of the operator are on the push buttons. If one of the push buttons is released, its associated pair of switches return to their first position and the solenoid is disconnected from L1.

The circuit of FIG. 1 requires PB1 and PB2 to be closed within a very short time of each other if solenoid S is to be operated, the time being dependent on the rate of discharge of capacitor C through the relay coils.

An important feature of the circuit of FIG. 1 is its fail safe characteristics which can be seen from the following analysis of what happens in the event of possible failures:

1. Switch A1 welds closed in its first position illustrated:
   Operation of PB1 and PB2 within the predetermined short time of each other will enable solenoid S to receive a pulse of power which, if the solenoid has been selected to respond to a pulse, will operate as desired. But if the solenoid has not been selected to respond to a pulse (and the circuit is thus operated with switch P closed) A1 will prevent solenoid S from receiving more than a pulse because A1, welded in its first position, does not, when relays A and B are operated, permit continued supply of power to the relay coils from L1 through B1, P and A1.
2. Switch A1 does not make contact in its first position illustrated:
   Capacitor C does not charge.
3. Switch A1 welds closed in its second position:
   Capacitor C does not charge.
4. Switch A1 does not make contact in its second position
   See (1) above.
5. Switch A2 welds closed in its first position illustrated:
   Solenoid S receives no power.
6. Switch A2 does not make contact in its first position illustrated:
   Capacitor C does not charge.
7. Switch A2 welds closed in its second position:
   Capacitor C does not charge.
8. Switch A2 does not make contact in its second position:
   Solenoid S receives no power.
9. Switch B1 welds closed in its first position illustrated:
   Operation as in (1) above, but with B1 (rather than A1) preventing continued supply of power to the relay coils through B1, P and A1.
10. Switch B1 does not make contact in its first position illustrated:
    Capacitor C does not charge.
11. Switch B1 welds closed in its second position:
    Capacitor C does not charge.
12. Switch B1 does not make contact in its second position:
    See (9) above.
13. Switch B2 welds closed in its first position illustrated:
    Solenoid S receives no power.
14. Switch B2 does not make contact in its first position illustrated:
    Capacitor C does not charge.
15. Switch B2 welds closed in its second position:
    Capacitor C does not charge.
16. Switch B2 does not make contact in its second position:
    Solenoid S receives no power.
17. Switch P is pre-set open or closed (or may be replaced by an open circuit or a through connector) but its failure would have no more effect than a failure of A1 or B1.
18. A too low supply voltage, an open or shorted relay coil, or a mechanically broken relay, locked in its dropped out or picked up condition, will make the unit inoperative because the capacitor fails to obtain or maintain its charge, or the connections required for normal operation of the solenoid cannot be completed.
19. If either of the push buttons PB1 or PB2 fails to close, its associated relay coil A or B cannot be energized, and if either is permanently closed the capacitor cannot charge.
20. An open or shorted capacitor C will make the relays inoperable. A leaking capacitor could result in intermittent or unreliable, but still safe, two hand operation.
21. The same applied to the rectifier diode D: a leaking diode will result in insufficient D.C. voltage to operate the relay coils.
22. Unsafe, one hand operation cannot be triggered by an excessively high supply voltage, or by a shorted or open resistor or by an open connection.

Fail safe operation is independent of relay maladjustment (spacing or spring tension) or deterioration and is independent of changes in supply voltage. Whereas relays A and B are D.C. operated relays, the solenoid S may be an A.C. relay of a different type, for example a reliable industrial contactor.

An important feature of the circuits of this invention is that one side may be grounded, so that accidental grounding of the other side, as by unintentional grounding of one of the relay coils or switches, will result in solenoid S receiving no power (and perhaps blowing of a line fuse or of diode D).

Figure 2:
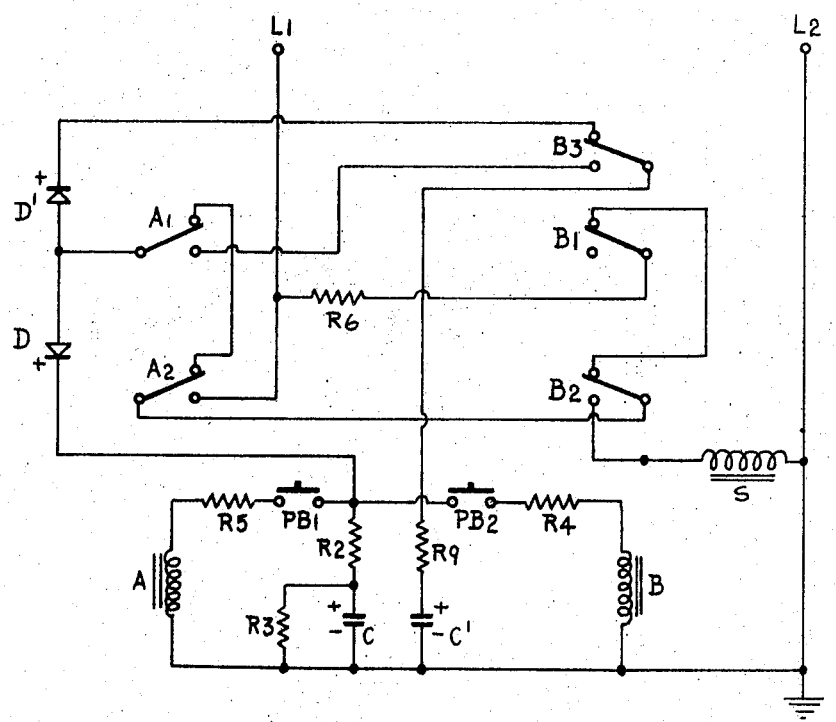
FIG. 2 shows a modified circuit capable of providing a pulse of longer duration.

The circuit of FIG. 2 is a modification of the circuit of FIG. 1, arranged to provide a pulse to solenoid S of longer duration than the pulse obtained in FIG. 1 with switch P open. FIG. 2 illustrates the first or normal position of the switches of relays A and B. The capacitor C is charged from L1 through series-connected current limiting resistor R6, switch B1, switch B2, switch A2, switch A1, diode D and surge protection resistor R2. A supplementary capacitor $C^1$ is also charged through a diode $D^1$, switch B3 of relay B, and surge protection resistor R9. When the push button switches PB1 and PB2 are closed within a predetermined time of each other, both relays A and B are energized by discharge of capacitor C, moving relay switches A1, A2, B1, B2, and B3 to their second positions. Switch B3 now connects supplementary capacitor $C^1$ through switch A1 and diode D so that capacitor $C^1$ provides a boost to the already partly discharged capacitor C, with the effect of extending the time that both relays A and B remain energized, thus lengthening the duration of the pulse through solenoid S from L1 through A2 and B2. The duration of the pulse will depend on the capacitance of $C^1$ but in a typical case $C^1$ may lengthen the pulse by half a second. An analysis of FIG. 2 similar to that provided above for FIG. 1 will show that it also fails safe.

The circuits of FIGS. 1 and 2 may of course be incorporated in more complex controls which, after the push buttons PB1 and PB2 have been pushed substantially simultaneously, bypass one or both of the push buttons to free one or both hands of the operator. Additional devices may be incorporatd to permit varying the durations of pulses. Other modifications will suggest themselves to those skilled in the art and are intended to be covered by the following claims.

What I claim as my invention is:

1. A safety circuit for energizing an electrical device, comprising a capacitor, a first and a second relay each having a pair of switches, said switches all having first positions in which they are connected in series with the capacitor for charging the capacitor from a power supply, each relay having a coil connectable across the capacitor through a closable switch for energization of the coil by discharge of the capacitor therethrough, each coil when so energized moving its said switches to second positions, one switch of each pair in its second position being in series with one switch of the other pair in its second position for connecting said device to the power supply.

2. A circuit as claimed in claim 1, wherein said relay switches are in their first positions in series between one side of the capacitor and one side of the power supply.

3. A circuit as claimed in claim 2, wherein the other side of the capacitor is grounded.

4. A circuit as claimed in claim 2, including means for supplementing the charge on the capacitor for energization of the coils.

5. A circuit as claimed in claim 4, wherein said supplementing means comprise a second capacitor and a third switch of one of the relays for connecting the second capacitor to the power supply in the first position of the switches and for connecting the second capacitor across the first capacitor in the second position of the switches.

6. A circuit as claimed in claim 4, wherein said supplementing means comprise a series connection of the other switches of each pair when in said second positions to reconnect said one side of the capacitor to the power supply.

7. A circuit as claimed in claim 6, including a current limiting resistor in series with the switches of said pairs in their first positions but bypassed by the series connection of said other switches of said pairs when in their second positions.

* * * * *